United States Patent
Mathias (10) Patent No.: US 11,812,891 B2
(45) Date of Patent: Nov. 14, 2023

(54) BREW BASKET FOR AUTOMATED BEVERAGE BREWING APPARATUS

(71) Applicant: SharkNinja Operating, LLC, Needham, MA (US)

(72) Inventor: Richard Rhys Mathias, Brookline, MA (US)

(73) Assignee: SharkNinja Operating, LLC, Needham, MA (US)

( * ) Notice: Subject to any disclaimer, the term of this patent is extended or adjusted under 35 U.S.C. 154(b) by 568 days.

(21) Appl. No.: 17/060,948

(22) Filed: Oct. 1, 2020

(65) Prior Publication Data

US 2021/0015295 A1 Jan. 21, 2021

Related U.S. Application Data

(62) Division of application No. 15/405,856, filed on Jan. 13, 2017, now Pat. No. 10,799,060.

(60) Provisional application No. 62/278,597, filed on Jan. 14, 2016.

(51) Int. Cl.
*A47J 31/06* (2006.01)
*A47J 31/44* (2006.01)
*A47J 31/10* (2006.01)

(52) U.S. Cl.
CPC ......... *A47J 31/446* (2013.01); *A47J 31/061* (2013.01); *A47J 31/0615* (2013.01); *A47J 31/10* (2013.01); *A47J 31/4403* (2013.01); *A47J 31/0626* (2013.01)

(58) Field of Classification Search
CPC .. A47J 31/061; A47J 31/0605; A47J 31/0615; A47J 31/0626; A47J 31/0663
USPC .......................................................... 99/299
See application file for complete search history.

(56) References Cited

U.S. PATENT DOCUMENTS

| | | | |
|---|---|---|---|
| 4,608,916 A * | 9/1986 | Becker | A47J 31/402 |
| | | | 99/305 |
| 4,771,680 A * | 9/1988 | Snowball | A47J 31/0615 |
| | | | 99/295 |
| 4,811,657 A | 3/1989 | Rixen | |
| 5,133,247 A | 7/1992 | Pastrick | |
| 5,485,778 A | 1/1996 | Ullmann | |
| 5,503,060 A | 4/1996 | Morecroft et al. | |
| 5,526,733 A | 6/1996 | Klawuhn et al. | |
| 5,957,036 A | 9/1999 | Warner et al. | |

(Continued)

FOREIGN PATENT DOCUMENTS

| | | |
|---|---|---|
| CN | 101801246 A | 8/2010 |
| ES | 1035299 U | 4/1997 |
| JP | S6239634 U | 3/1987 |

OTHER PUBLICATIONS

Chinese Office Action; International Application No. 201780006585. X; International Filing Date: Jul. 12, 2018; dated Apr. 3, 2020; 12 pages.

International Preliminary Report on Patentability; International Application No. PCT/US2017/013378; International Filing Date: Jan. 13, 2017; dated Jul. 17, 2018; 6 Pages.

(Continued)

*Primary Examiner* — Reginald Alexander
(74) *Attorney, Agent, or Firm* — MINTZ LEVIN COHN FERRIS GLOVSKY AND POPEO, PC (57) ABSTRACT

A beverage system is provided including a housing and a brew basket body connected to said housing. The brew basket body is movable between a retracted position and an extended position. When said brew basket body is in said retracted position, said brew basket body is arranged in sealing contact with an adjacent component of said beverage system.

11 Claims, 13 Drawing Sheets

(56) References Cited

U.S. PATENT DOCUMENTS

| | | | |
|---|---|---|---|
| 5,964,141 | A | 10/1999 | Andrew et al. |
| 6,425,317 | B1 * | 7/2002 | Simmons ............ A47J 31/0615 |
| | | | 426/433 |
| 6,571,686 | B1 | 6/2003 | Riley et al. |
| 8,042,454 | B2 | 10/2011 | De'Longhi |
| 2007/0151458 | A1 | 7/2007 | Chen et al. |
| 2009/0074930 | A1 | 3/2009 | Hammad |
| 2011/0081466 | A1 | 4/2011 | Lassota |
| 2012/0060697 | A1 | 3/2012 | Ozanne |
| 2012/0121779 | A1 | 5/2012 | Lai et al. |
| 2015/0257578 | A1 * | 9/2015 | Windler ............ B65D 85/8061 |
| | | | 99/295 |
| 2015/0359378 | A1 | 12/2015 | Anthony et al. |
| 2017/0202392 | A1 | 7/2017 | Mathias |

OTHER PUBLICATIONS

International Search Report; International Application No. PCT/US2017/013378; International Filing Date: Jan. 13, 2017; dated Apr. 3, 2017; 5 Pages.
U.S. Non-Final Office Action; U.S. Appl. No. 15/405,856, filed Jan. 13, 2017; dated Sep. 6, 2019; 14 pages.
Written Opinion of the International Searching Authority; International Application No. PCT/US2017/013378; International Filing Date: Jan. 13, 2017; dated Apr. 3, 2017; 5 Pages.
Extended European Search Report for Application No. EP 22183433.6, dated Jan. 23, 2023, 14 pages.
Partial European Search Report for Application No. EP 22183433.6, dated Oct. 18, 2022, 13 pages.

* cited by examiner

BREW BASKET FOR AUTOMATED BEVERAGE BREWING APPARATUS

CROSS-REFERENCE TO RELATED APPLICATIONS

This application is a divisional of U.S. application Ser. No. 15/405,856 filed Jan. 13, 2017, which claims the benefit of U.S. provisional patent application Ser. No. 62/278,597 filed Jan. 14, 2016, the entire contents of which are incorporated herein by reference.

BACKGROUND

Exemplary embodiments of the present disclosure relate to a system and method for brewing beverages, and more particularly to a system and method of automatically brewing a beverage having a desired flavor profile.

Various systems and methods for brewing a beverage, such as coffee, are known. Known systems include drip brewing systems in which hot water is brewed through coffee grounds and into a carafe and French press systems in which coffee grounds and hot water are mixed in a container and a water permeable plunger is pressed into the container from above to trap the ground coffee at the bottom of the container.

SUMMARY

According to one embodiment, a beverage system is provided including a housing and a brew basket body mounted to said housing for receiving a fluid. The brew basket body is pivotably mounted to said housing for movement between a retracted position and an extended position. The brew basket body includes a brew chamber for receiving a flavorant and at least one outlet through which fluid exits said brew basket.

In addition to one or more of the features described above, or as an alternative, in further embodiments said brew basket body includes at least an open first end and a closed second end, said at least one outlet being formed in said second, closed end.

In addition to one or more of the features described above, or as an alternative, in further embodiments a plug operably coupled to a biasing mechanism is arranged within said at least one outlet, said plug being movable between a sealed position and an open position.

In addition to one or more of the features described above, or as an alternative, in further embodiments comprising a cap mounted to said second end via said at least one biasing mechanism, said cap being operably coupled to said plug to move said plug between said sealed position and said open position.

In addition to one or more of the features described above, or as an alternative, in further embodiments during movement of said brew basket body between an extended position and a retracted position, said cap is configured to associate with an adjacent cam surface to apply a force to said at least one biasing mechanism.

In addition to one or more of the features described above, or as an alternative, in further embodiments said association of said cap with said cam surface causes said brew basket body to move vertically as said body rotates from said extended position to said retracted position.

In addition to one or more of the features described above, or as an alternative, in further embodiments when said brew basket body is in said retracted position, said first end of said brew basket body is arranged in sealing contact with an adjacent component of said beverage brewing system.

In addition to one or more of the features described above, or as an alternative, in further embodiments comprising a drip stop assembly associated with said brew basket body, said drip stop assembly being rotatable to selectively restrict a flow through said at least one outlet.

In addition to one or more of the features described above, or as an alternative, in further embodiments said at least one outlet includes a siphon having a pipe fluidly coupled to said brew chamber and extending from said a sidewall of said brew basket body.

In addition to one or more of the features described above, or as an alternative, in further embodiments movement of said brew basket body from a retracted position to an extended position pinches said pipe to restrict a flow there through.

In addition to one or more of the features described above, or as an alternative, in further embodiments said brew basket includes a support connected to said housing and said brew basket body is insertable into said support.

In addition to one or more of the features described above, or as an alternative, in further embodiments a collar is arranged within a hollow interior of said support, said collar being rotatable relative to said support.

In addition to one or more of the features described above, or as an alternative, in further embodiments said collar is coupled via a linkage to said housing.

In addition to one or more of the features described above, or as an alternative, in further embodiments said collar maintains a relative position during said movement of the brew basket body between said retracted position and said extended position.

In addition to one or more of the features described above, or as an alternative, in further embodiments said brew basket body includes at least one protrusion associated with said collar such that said brew basket body rotates with said collar relative to said support.

According to another embodiment, a beverage system includes a housing and a brew basket body connected to said housing. The brew basket body is movable between a retracted position and an extended position. When said brew basket body is in said retracted position, said brew basket body is arranged in sealing contact with an adjacent component of said beverage system.

In addition to one or more of the features described above, or as an alternative, in further embodiments said adjacent component of said beverage system includes a shower head.

According to another embodiment, a beverage system includes a housing a brew basket body. The brew basket body is connected to the housing and is movable between a retracted position and an extended position. The brew basket body includes at least one outlet. The at least one outlet is sealed when said brew basket body is moved from said retracted position to said extended position.

In addition to one or more of the features described above, or as an alternative, in further embodiments comprising an indicator that identifies when said brew basket body is in said retracted position.

In addition to one or more of the features described above, or as an alternative, in further embodiments comprising an indicator that identifies when said at least one outlet of said brew basket body is sealed.

According to another embodiment, a beverage system includes a housing and a brew basket body. The brew basket body is connected to the housing and is pivotable between a retracted position and an extended position. The brew body includes at least one outlet. An orientation of the brew basket body remains generally constant during movement between the retracted position and the extended position.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Aspects and embodiments disclosed herein include a system and method for preparing various brewed beverages. Although the disclosure is described herein with reference to preparing a brewed coffee beverage, preparation of other brewed beverages is within the scope of the disclosure. As the term is used herein, "coffee" refers to a beverage including solids extracted from coffee beans and dissolved in water. Brewed coffee is typically prepared by passing hot water through dried and ground coffee beans, referred to herein as "ground coffee." Solids from the ground coffee are dissolved in the hot water as it passes there through.

Figure 1:
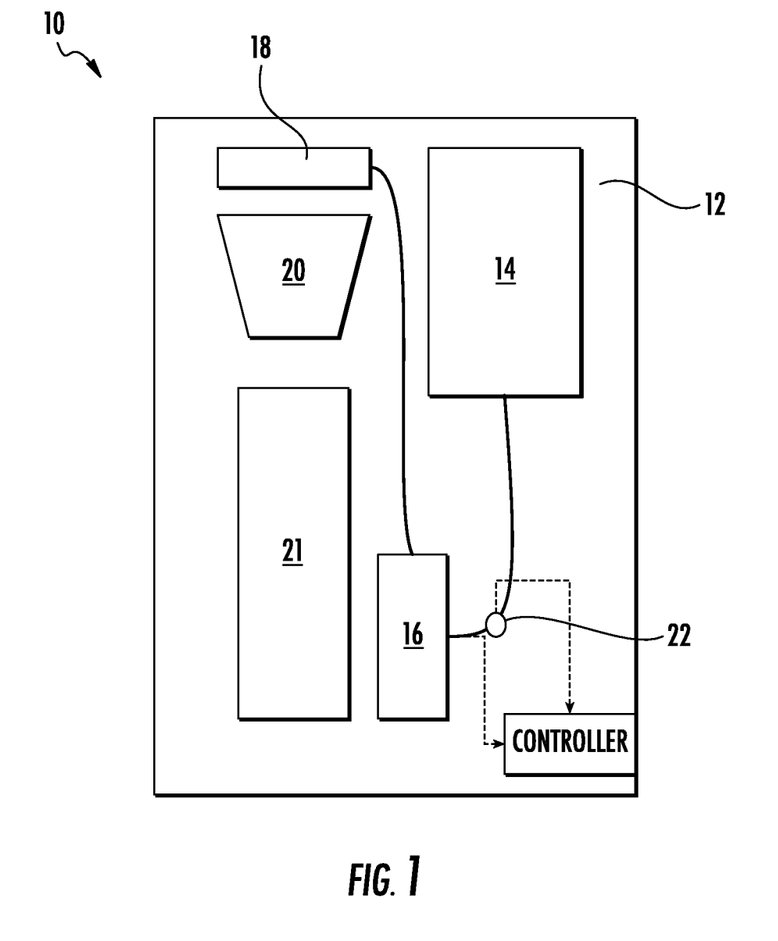
FIG. 1 is a schematic diagram of a beverage brewing apparatus according to an embodiment.

Referring now to FIG. 1, a schematic diagram of an example of a basic automatic beverage brewing system 10, such as a coffee maker for example, is illustrated in more detail. The apparatus includes a housing 12, a reservoir 14, a heating mechanism 16, a shower head 18, and a brew basket assembly 20. The reservoir 14, heating mechanism 16, showerhead 18, and brew basket 20 are arranged sequentially in fluid communication. Upon activation of the system 10, water or another fluid stored within the reservoir 14, is provided to a heating mechanism 16. After being heated to a desired temperature, the water is provided to the shower head 18. The shower head 18 is aligned with and disposed vertically above the brew basket assembly 20. The water is configured to flow through one or more holes formed in the shower head 18 onto coffee grounds or another flavorant contained within the brew basket assembly 20. The fluid containing a portion of the flavorant, is provided to a container 21 via an outlet formed near the bottom of the brew basket assembly 10.

As illustrated in FIG. 1, a flow meter 22 may be arranged within a conduit extending between the water reservoir 14 and the heating mechanism 16. As shown, the water reservoir 24 may be vertically aligned with the flow meter 22 such that water is fed to the system 10, and more specifically to the flow meter 22, by gravity. The flow meter 22 is configured to monitor an amount of water passing there through, which is generally indicative of the amount of water provided to the shower head 18. Various types of flow meters are within the scope of the disclosure. For example, the flow meter 22 may be a rotatable paddle wheel where each rotation generates a signal indicating that a known amount of water has passed through the flow meter 22. It should be understood that the beverage brewing system 10 illustrated and described herein is intended as an example only, and any other apparatus for preparing a brewed beverage, for example an apparatus including a pump for moving water there through, is within the scope of the disclosure.

Figure 2:
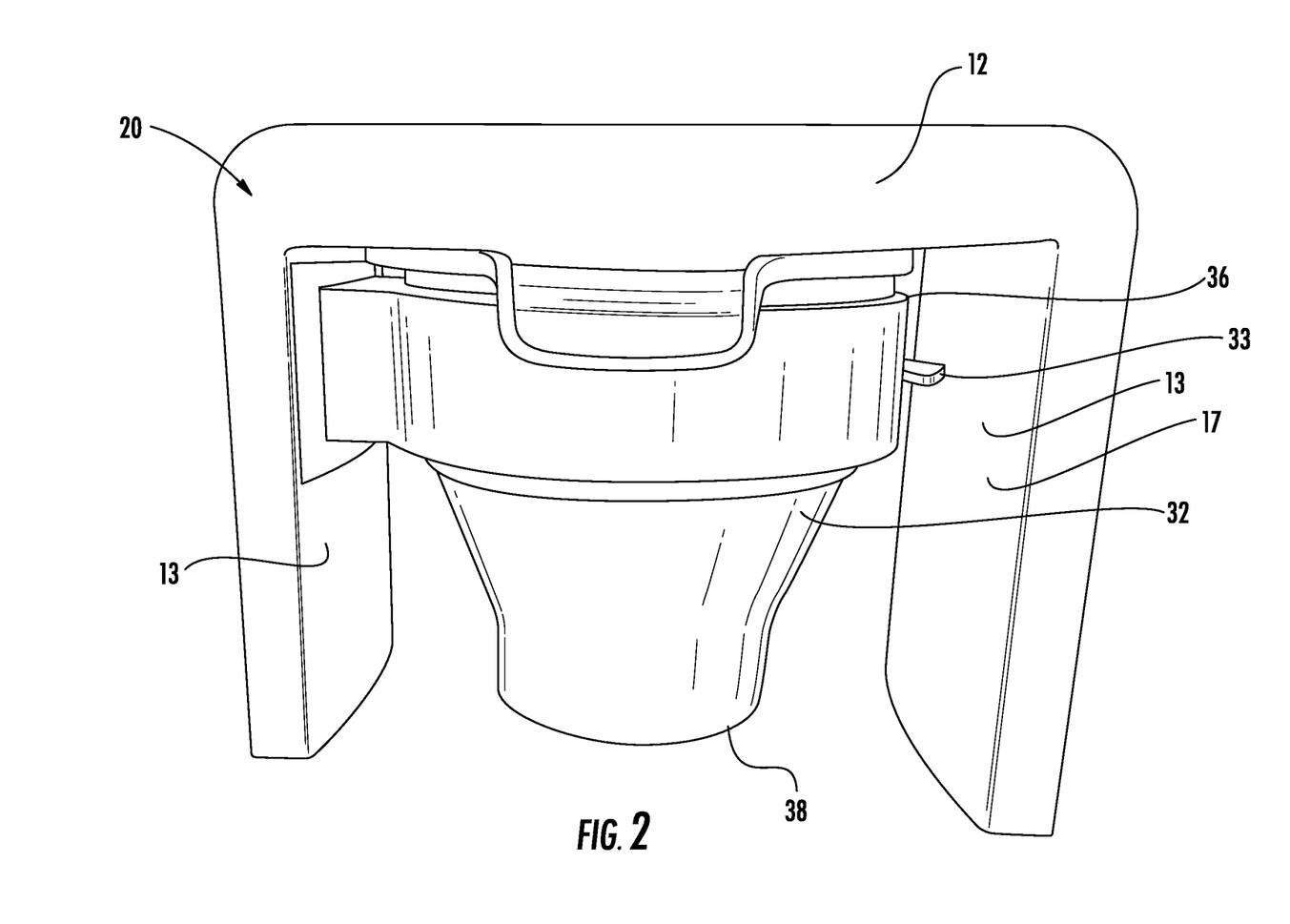
FIG. 2 is a front view of a retracted brew basket assembly according to an embodiment.
Figure 3:
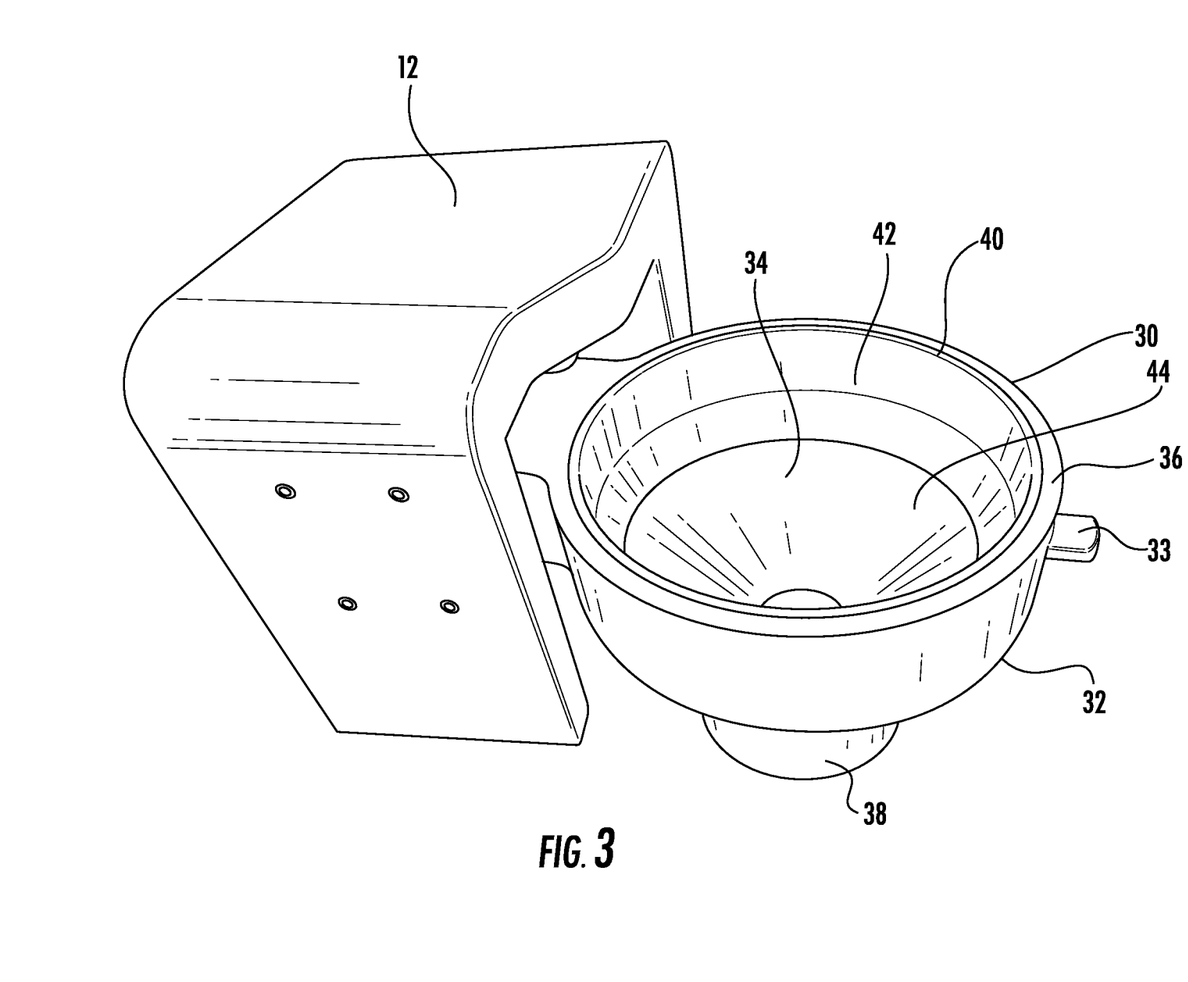
FIG. 3 is a side view of a body and collar of the brew basket assembly when the brew basket is in an extended position according to an embodiment.
Figure 9:
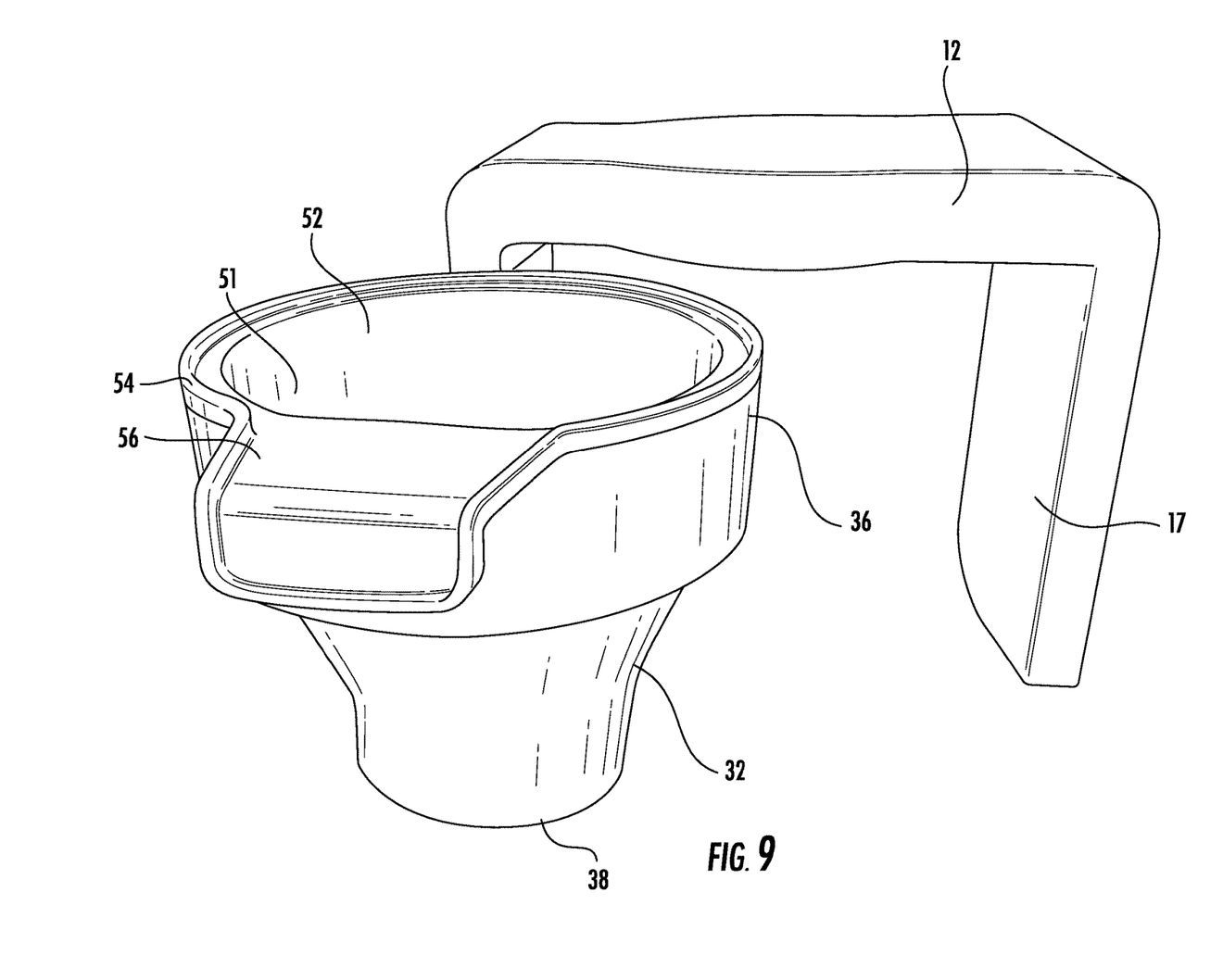
FIG. 9 is a front perspective view of an extended brew basket assembly according to an embodiment.
Figure 10:
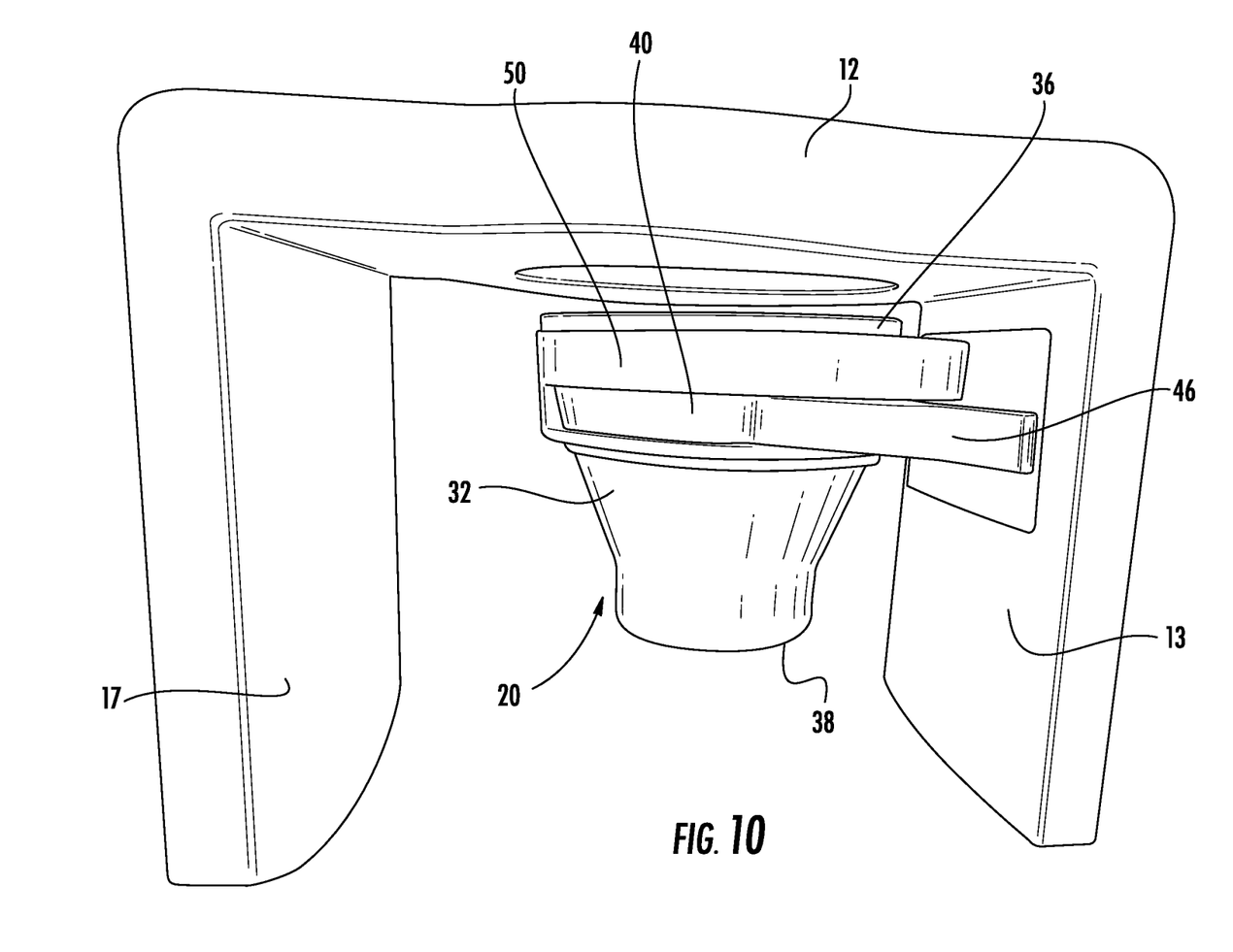
FIG. 10 is a back perspective view of an extended brew basket assembly according to an embodiment.
Figure 11:
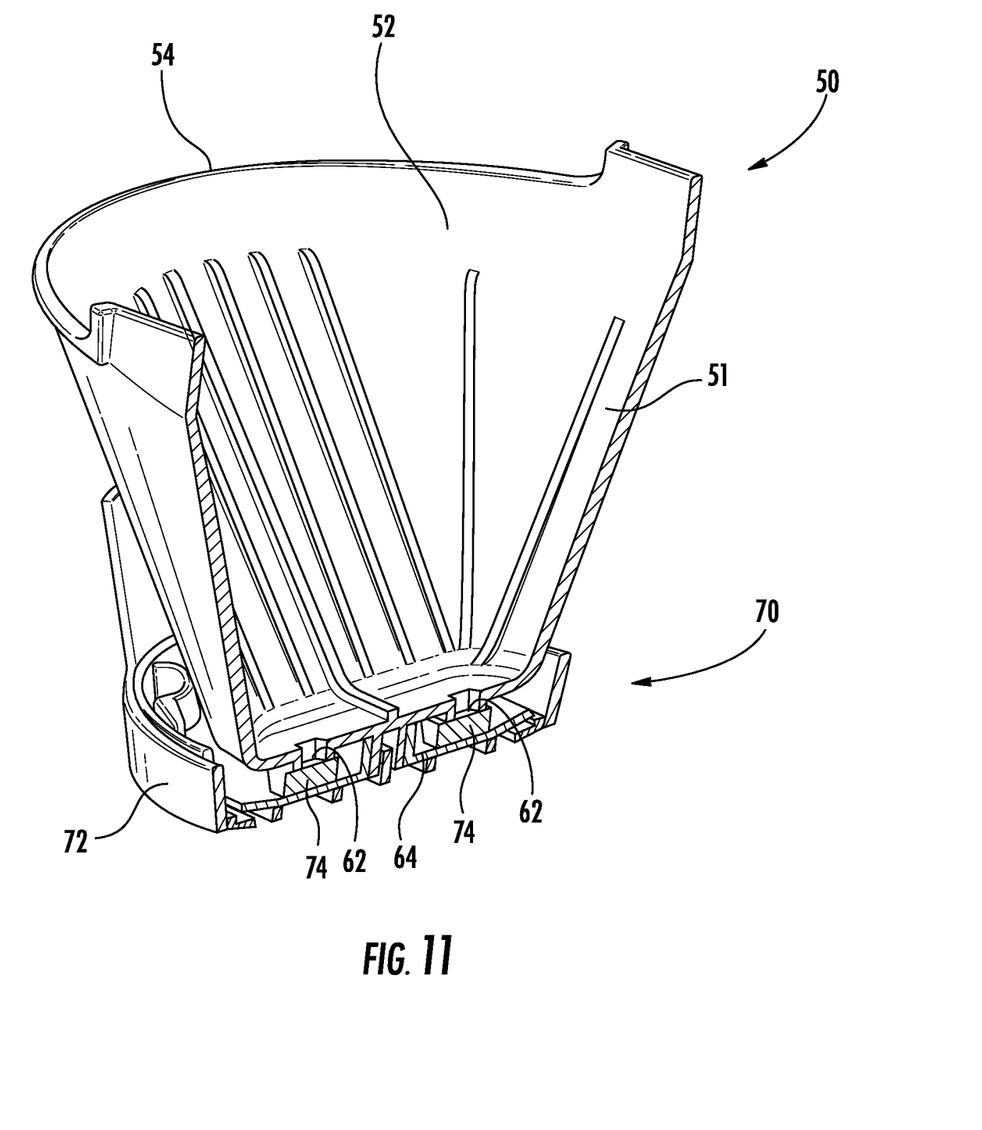
FIG. 11 is a perspective cross-sectional view of a brew basket according to an embodiment.

Referring now to FIGS. 2-12, the brew basket assembly 20 is illustrated in more detail. The brew basket assembly 20 includes a support 32 pivotally mounted to a portion of the housing 12, such as a sidewall 13 thereof for example, for movement between a retracted position (FIG. 2) and an extended position (FIG. 9). With reference to FIG. 2, the support 32 has a generally hollow interior 34 and a cross-sectional area of the hollow interior 34 generally decreases between a first open end 36 and a second open end 38 such that the support 32 has at least a partially conical shape. In one embodiment, a tab 33 protrudes from an exterior of the support 32 and is received within a corresponding track 15 formed in an adjacent surface 17 of the housing 12 when the brew basket assembly 20 is in the retracted position.

Mounted concentrically within a portion of the support 32, such as adjacent the first end 36 thereof for example, is a collar 40. In one embodiment, the collar 40 is arranged within a recessed portion of the support 32 such that an interior surface 42 of the collar 40 is substantially flush with an adjacent interior surface 44 of the support 32. In other embodiments, however, the collar includes a lip for preventing water ingress into the assembly 20. The collar 40 is attached via a linkage 46 (see FIG. 10) to a portion of the housing 12, such that collar 40 is configured to rotate relative to the support 32 as the support 32 pivots between the retracted and extended positions. In one embodiment, the linkage 46 is configured to maintain a relative positioning of the rotatable collar 40 during the movement of the support 32.

Figure 4:
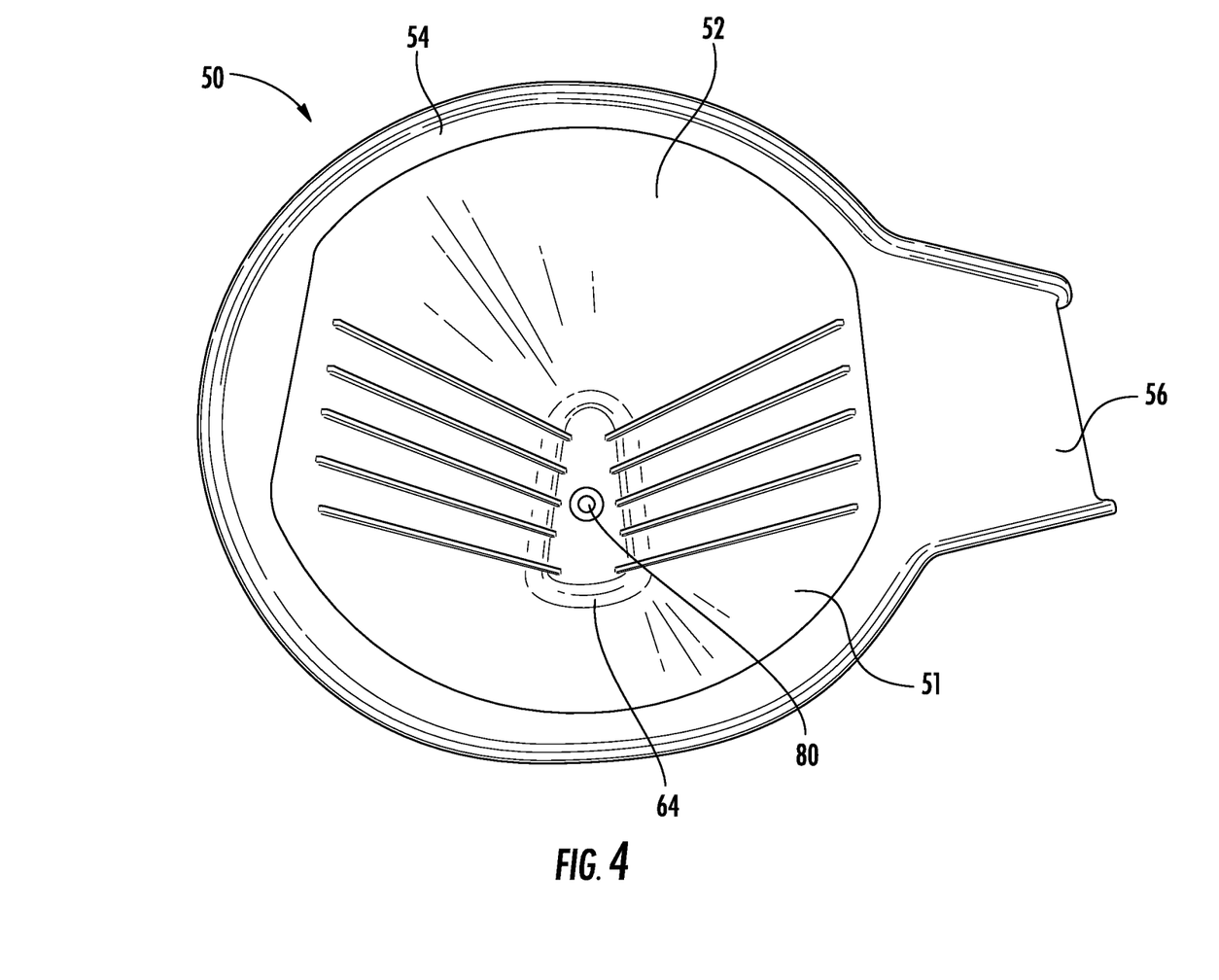
FIG. 4 is a top perspective view of a brew basket receivable within the body of the brew basket assembly according to an embodiment.
Figure 5:
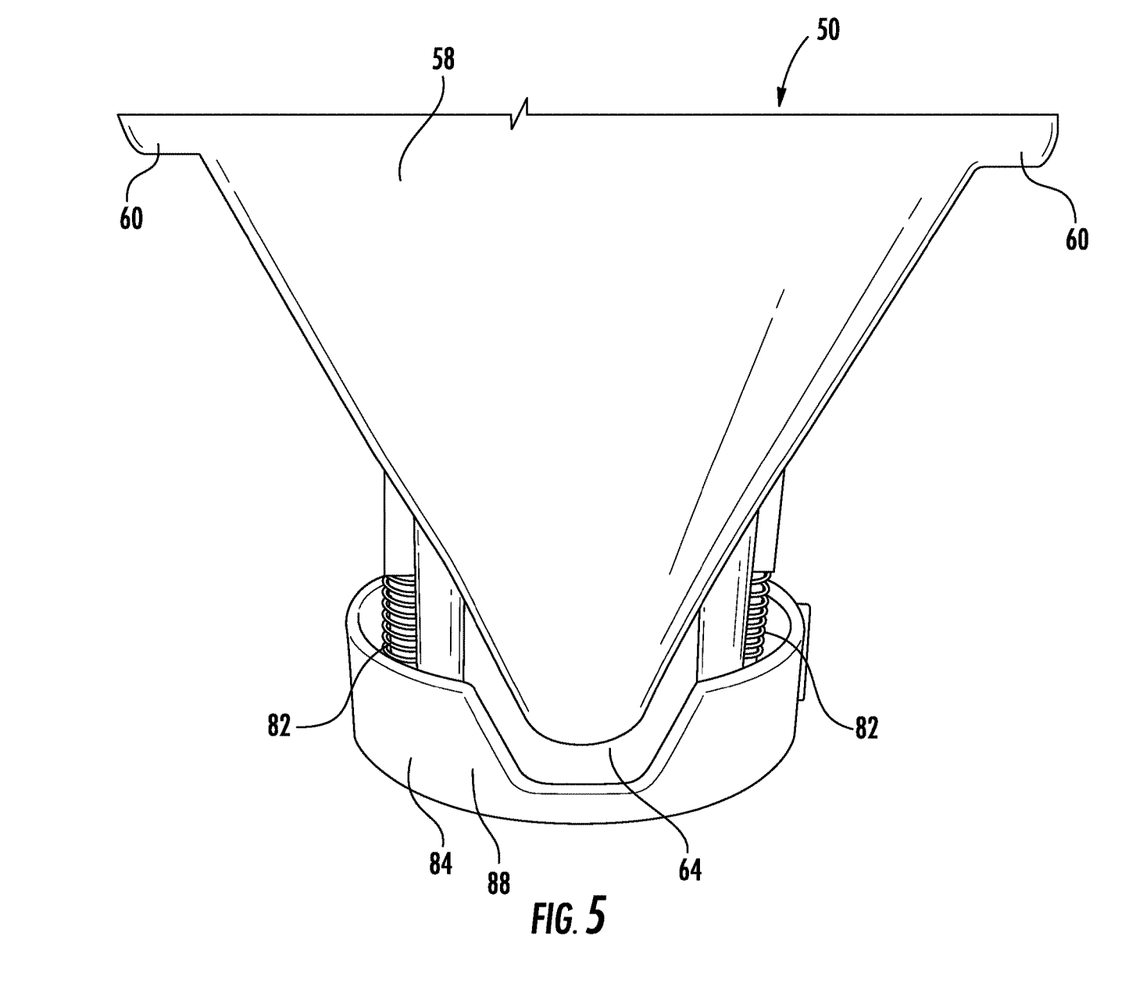
FIG. 5 is a side view of a second end of the brew basket according to an embodiment.
Figure 6:
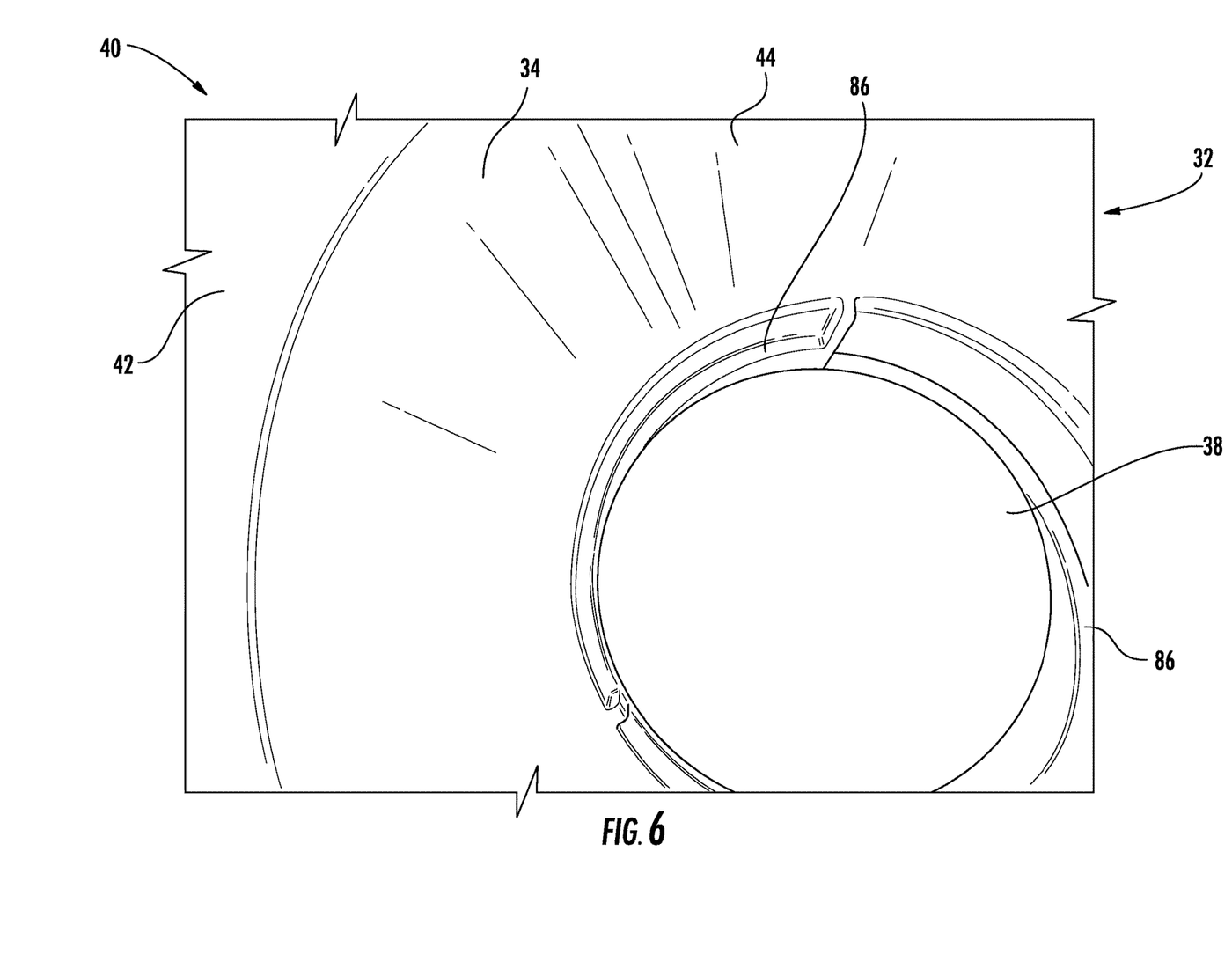
FIG. 6 is a top perspective view of an interior surface of the body according to an embodiment.
Figure 7:
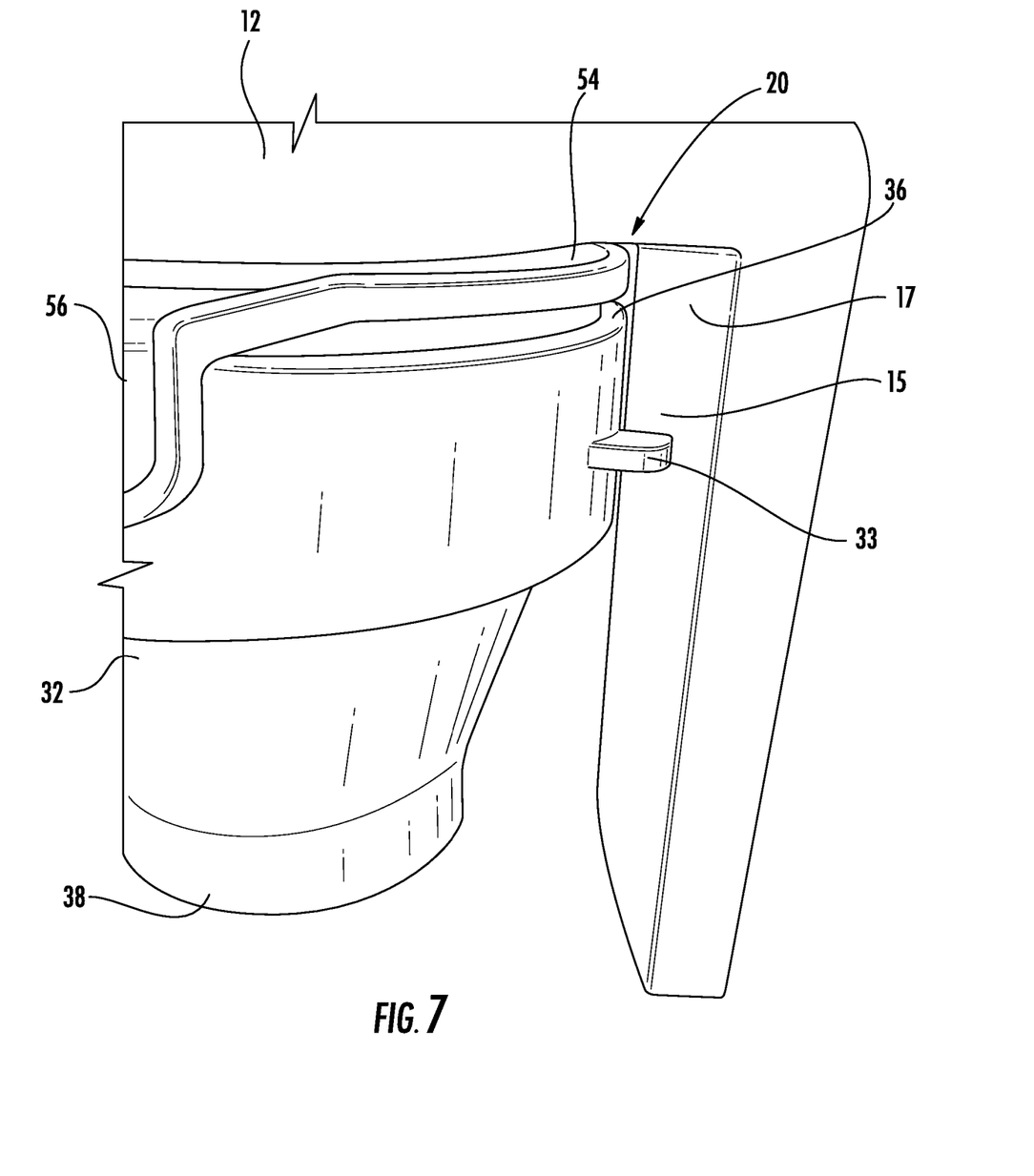
FIG. 7 is a front view of a partially extended brew basket assembly according to an embodiment.
Figure 8:
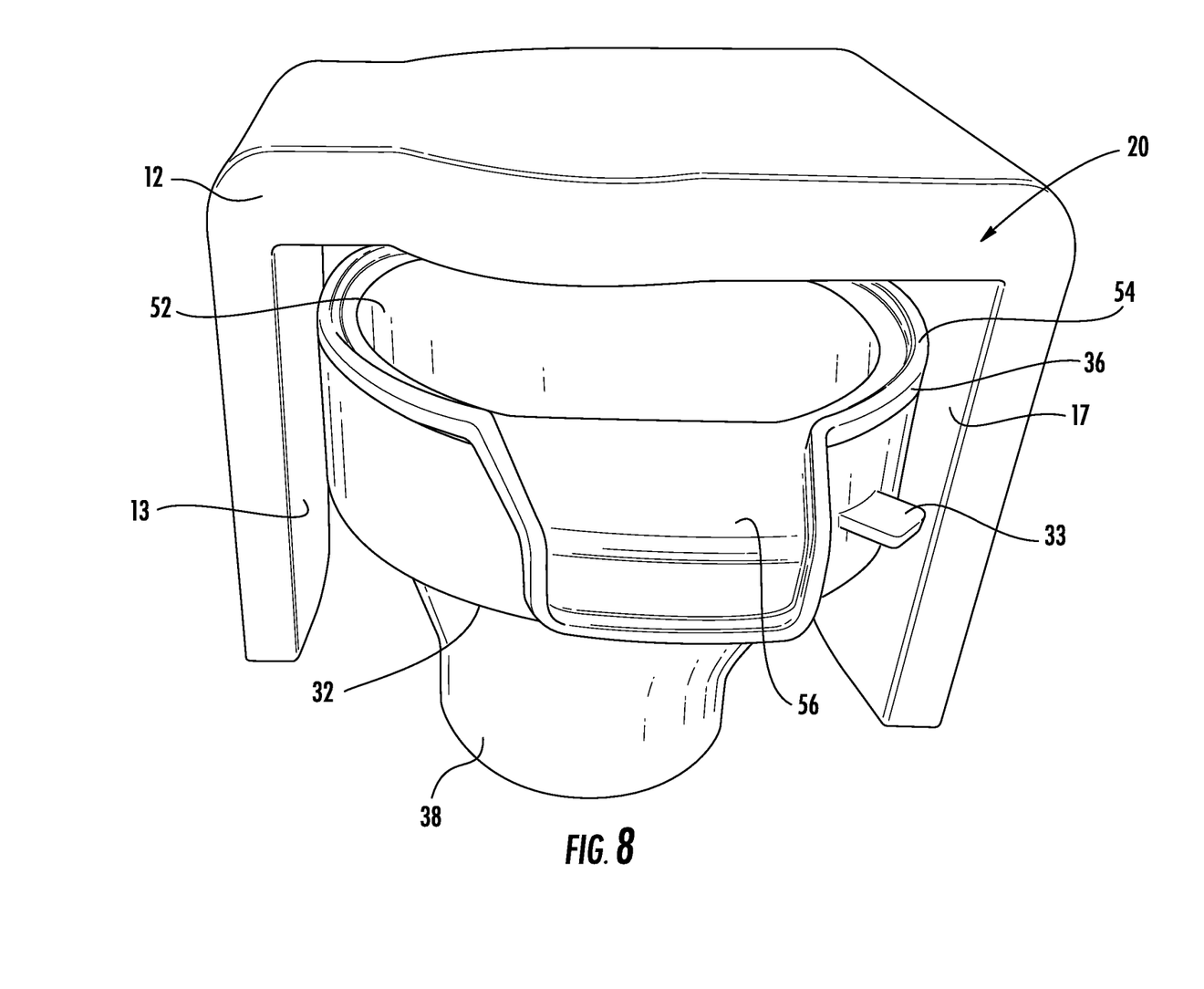
FIG. 8 is a front perspective view of a partially extended brew basket assembly according to an embodiment.

A brew basket 50 is receivable within the hollow interior 34 of the support 32 and the collar 40. As best shown in FIGS. 4 and 5, the brew basket 50 includes at least one sidewall that defines a hollow brew chamber 52 configured to receive a permanent or temporary filter (not shown) for holding a volume of flavorant, such as ground coffee for example. In the illustrated, non-limiting embodiment, the brew basket 50 has a generally conical shape and is generally complementary to the interior surfaces 42, 44 of the support 32 and collar 40. Arranged adjacent a first open end 54 of the brew basket 50 is a handle 56. The handle 56 may be used, via application of a force thereto, to pivot the brew basket assembly 20 between the retracted and extended positions. In embodiments where a permanent filter (not shown) is receivable within the brew basket 50, the permanent filter may include a handle complementary to and disposed in overlapping arrangement with handle 56, such that an operator of the beverage system 20 may easily empty the contents of the brew basket 50 and permanent filter, such as by turning the brew basket 50 upside down while holding both the handle 56 and the corresponding handle on the permanent filter for example.

Extending outwardly from an exterior surface 58 of the brew basket 50 is at least one protrusion 60. The at least one protrusion 60, best shown in FIG. 5, is configured to abut an adjacent portion of the collar 40 to restrict rotation of the brew basket 50 relative to the collar 40. Because the brew basket 50 and the collar 40 are configured to rotate together, the brew basket 50 similarly maintains a relative position during movement of the support 32 between the retracted and the extended positions. In one embodiment, as the support 32 rotates between the retracted position and the extended position, the brew basket 50 remains in a position such that the handle 56 is always arranged at the front of the beverage system 20, facing an operator (see FIGS. 7-9).

Figure 12A:
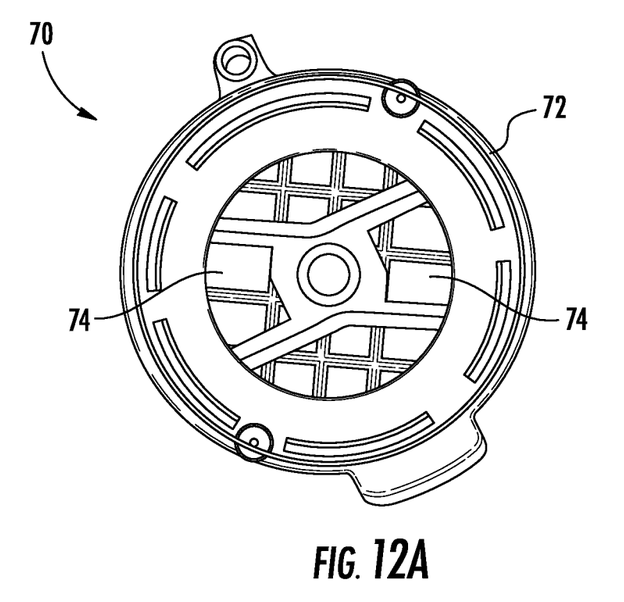
FIGS. 12A and 12B are top views of a drip stop assembly in an open position and a closed position, respectively, according to an embodiment.
Figure 12B:
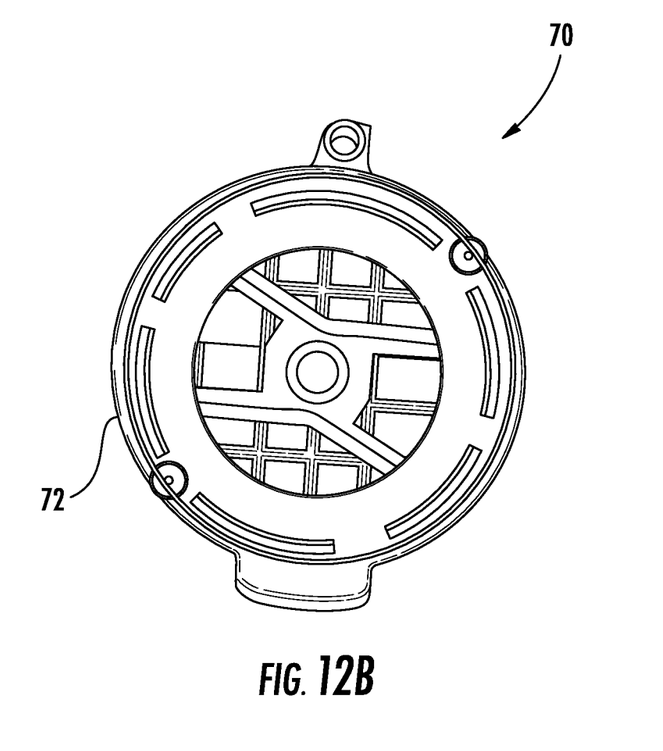

At least one outlet 62 (best shown in FIG. 11) is formed near a closed second end 64 of the brew basket 50. The at least one outlet 62 provides an opening through which fluid drains from the brew basket 50 to an adjacent container 21. The flow of fluid through the outlet 62 may be selectively controlled. In one embodiment, the brew basket assembly 20 includes a drip stop assembly 70 configured to selectively block the flow of a brewed beverage from the brew basket assembly 20, such as to allow the container 21 within which the brewed beverage is being collected to be changed. The drip stop assembly 70 includes a movable collar 72 mounted to the support 32 and configured to cooperate with the at least one outlet 62 formed near the second end 64 of the brew basket 50. The drip stop collar 72 has a specific geometric configuration including at least one gasket 74 and is rotatable between a first position (FIG. 12a) and a second position (FIG. 12b). When the drip stop collar 72 is in the first position, the geometric configuration and the at least one gasket 74 are arranged to allow the brewed beverage to drip from at least one outlet 64 of the brew basket 50. When the collar 72 is in the second position, the geometric configuration and the at least one gasket 74 interfere with the at least one outlet 62 to block a flow of fluid there through.

Referring again to FIG. 4, in another embodiment, a plug 80 may be associated with each outlet 62 and may be movable between a closed position (in contact with an adjacent surface) and an open position (separated from the adjacent surface by a distance) to selectively allow the fluid to flow there through. A biasing mechanism 82 may be configured to bias the plug 80 into the closed position. In the illustrated, non-limiting embodiment of FIG. 5, a cap 84 operably coupled to the plug 80 is movably mounted adjacent the second end 64 of the brew basket 50 with at least one biasing mechanism 82. Association of the brew basket 50 with the body 52 may be configured to apply a force to the biasing mechanism 82 to open the plug 80. In one embodiment, illustrated in FIG. 6, one or more sloped tracks 86, configured as cam surfaces may be formed in the interior surface 44 of the support 32. When the brew basket 50 and cap 84 are positioned within the interior 34 of the support 32, a protrusion 88 formed in the cap 84 engages a complementary track 86 of the support 32. As the support 32 is rotates from an extended position to a retracted position, the movement of the protrusion 88 within the track 86 not only vertically lifts the brew basket 50 relative to the support 32, but also applies a force to the at least one biasing mechanism 84 causing the plug 80 to move to the open position. The vertical movement of the brew basket 50 relative to the support 32 moves the first end 54 of the brew basket 50 into contact with an adjacent surface, such as a mating ring on the shower head 28 for example.

Figure 13:
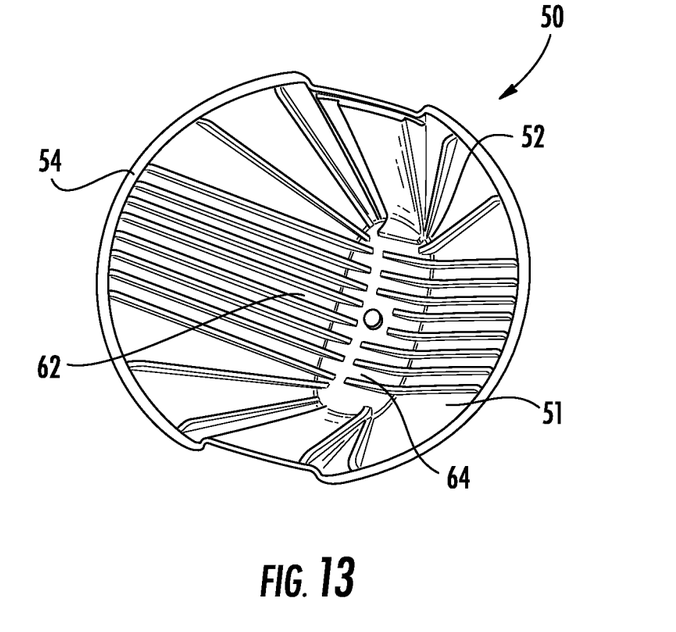
FIG. 13 is a top perspective view of a brew basket according to another embodiment.
Figure 14:
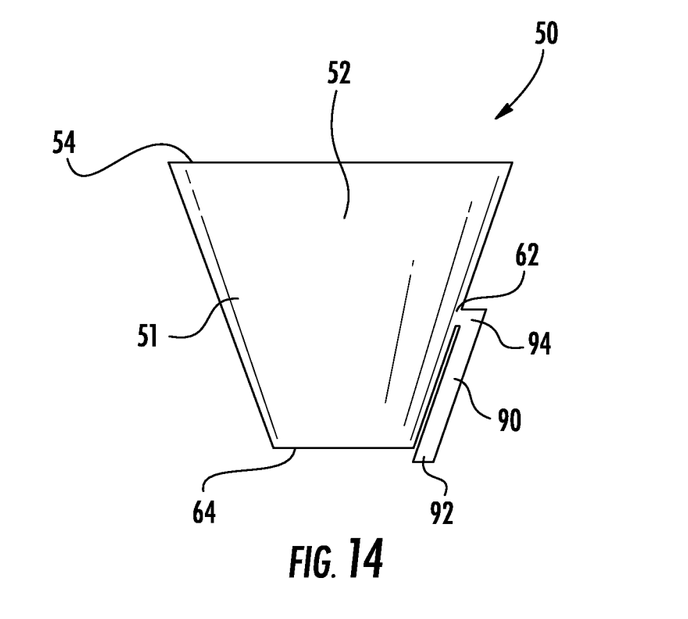
FIG. 14 is a side view of the brew basket of FIG. 13 according to an embodiment.

In yet another embodiment, illustrated in FIGS. 13 and 14, the at least one outlet 62 may include a siphon having a pipe 90 fluidly coupled to the brew chamber 52 and extending parallel to or at an angle to a sidewall 51 of the brew chamber 52 such that an exit point 92 of the pipe 90 is disposed vertically below the lowest surface holding fluids in the brew chamber 52. In such embodiments, fluid is configured to flow out of the brew basket 50 in a siphoned manner if during the brewing process at least enough water has been poured into the brew chamber 52 to completely fill the bend 94 in the pipe 90. A brew basket 50 having a siphoned stream provides the added benefits of reduced splashing due to a more laminar flow and a clean cut off with minimal dripping at the end of a brew operation. To selectively control the flow of fluid through pipe 90, the support 32 or collar 40 may be configured to apply a pressure to or squeeze the pipe 90 to restrict a flow there through when the support 32 is rotated to an extended position relative to the housing 22.

The system 10 may include one or more indicators, such as a light for example, configured to indicate to user whether the brew basket assembly 20 is in the retracted position ready for a brewing operation. Alternatively, or in addition, the system may 10 include one or more indicators configured to indicate whether the at least one outlet 62 of the brew basket 50 is open to allow a brewed beverage to flow freely to an adjacent container 21.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A beverage system, comprising:
   a housing;
   a brew basket body connected to said housing and having an open first end, a closed second end, at least one sidewall extending between said open first end and said closed second end, and at least one outlet formed in said closed second end, said at least one outlet comprising a plug arranged therein and moveable between a sealed position and an open position, said closed second end arranged within a cap surrounding said closed second end and operably coupled to said plug, said cap configured to move said plug between said sealed position and said open position via at least one biasing mechanism coupling said at least one side wall and said cap, said brew basket body being movable between a retracted position and an extended position, wherein when said brew basket body is in said retracted position, said brew basket body is arranged in sealing contact with an adjacent component of said beverage system.

2. The beverage system according to claim 1, wherein said adjacent component of said beverage system includes a shower head.

3. The beverage system according to claim 1, wherein during movement of said brew basket body between said extended position and said retracted position, said cap is configured to associate with an adjacent cam surface to apply a force to said at least one biasing mechanism.

4. The beverage system according to claim 3, wherein said association of said cap with said cam surface causes said brew basket body to move vertically as said body rotates from said extended position to said retracted position.

5. The beverage system according to claim 1, wherein said at least one outlet includes a siphon having a pipe fluidly coupled to an interior of said brew basket body and extending from said a sidewall of said brew basket body.

6. A beverage system, comprising:
   a housing;
   a brew basket body connected to said housing and having an open first end, a closed second end, at least one sidewall extending between said open first end and said closed second end, and at least one outlet formed in said closed second end, said at least one outlet comprising a plug arranged therein and moveable between a sealed position and an open position, said closed second end arranged within a cap surrounding said closed second end and operably coupled to said plug, said cap configured to move said plug between said sealed position and said open position via at least one biasing mechanism coupling said at least one side wall and said cap, said brew basket body being movable between a retracted position and an extended position, wherein said at least one outlet is sealed when said brew basket body is moved from said retracted position to said extended position.

7. The beverage brewing system according to claim 6, further comprising an indicator that identifies when said brew basket body is in said retracted position.

8. The beverage brewing system according to claim 6, further comprising an indicator that identifies when said at least one outlet of said brew basket body is sealed.

9. The beverage system according to claim 6, further comprising a drip stop assembly associated with said brew basket body, said drip stop assembly being rotatable to selectively restrict a flow through said at least one outlet.

10. The beverage system according to claim 6, wherein said at least one outlet includes a siphon having a pipe fluidly coupled to an interior of said brew basket body.

11. The beverage system according to claim 10, wherein movement of said brew basket body from a retracted position to an extended position pinches said pipe to restrict a flow there through.

* * * * *